United States Patent [19]

Ichikawa et al.

[11] Patent Number: 5,496,780
[45] Date of Patent: Mar. 5, 1996

[54] METHOD FOR PRODUCING SILICA BRICK

[75] Inventors: Kenji Ichikawa, Okayama; Hisayuki Harako, Tokyo; Teiichi Fujiwara; Masashi Taniguchi, both of Okayama, all of Japan

[73] Assignee: Shinagawa Refractories Co., Ltd., Tokyo, Japan

[21] Appl. No.: 385,309

[22] Filed: Feb. 7, 1995

[30] Foreign Application Priority Data

Mar. 2, 1994 [JP] Japan ................. 6-056572

[51] Int. Cl.$^6$ ............................................. C04B 35/14
[52] U.S. Cl. .................................................. 501/133
[58] Field of Search .............................. 501/133, 126

[56] References Cited

U.S. PATENT DOCUMENTS 4,183,761  1/1980  Hoshino et al. ..................... 501/133
4,866,015  9/1989  Koschlig et al. .................... 501/133
4,988,649  1/1991  Santowski et al. .................. 501/133

*Primary Examiner*—Karl Group
*Attorney, Agent, or Firm*—Sughrue, Mion, Zinn, Macpeak & Seas

[57] ABSTRACT

A method for producing silica brick comprising firing a siliceous stone material containing silica as a main component is disclosed, in which 0.05 to 0.25% by weight of $Na_2O$—$CaO$—$SiO_2$ fused and solidified material and 0.1 to 1.0% by weight, in terms of $Fe_2O_3$, of iron oxide are added to the siliceous stone material, before firing. Transformation of silica into tridymite is effectively accelerated to provide silica bricks mainly comprising tridymite with reduced contents of residual silica and amorphous glass and exhibiting improved creep resistance.

4 Claims, No Drawings

METHOD FOR PRODUCING SILICA BRICK

FIELD OF THE INVENTION

This invention relates to a method for producing silica brick and more particularly a method for producing silica brick which can suitably be used in building up or repairing various industrial furnaces such as a coke oven and a hot blast stove.

BACKGROUND OF THE INVENTION

Silica brick is a very important material which is used as refractory for building up and repairing industrial furnaces, mainly coke ovens and hot blast stoves. It is well known that silica, which is the main component of siliceous stone material as the principal material of silica brick, is changed into cristobalite and tridymite due to crystalline transformation in the course of firing for production of the silica brick. Silica brick having a large content of non-transformed silica is unfavorable because it exhibits extraordinary expansion in use as the refractory of industrial furnaces, resulting in impairment of stability of the furnaces. Therefore, the extent of transformation of silica is one of very important factors which have to be considered in designing an industrial furnace in regard to selection of material and evaluation of adequateness of the use of the selected material.

A general process for producing silica brick comprises the steps of pulverizing a siliceous stone material, such as composite quartzite (red-white or blue-white), into particles of appropriate size and mixing the particles with lime (CaO) which is an additive also serving as a binder.

A silica brick for use as a material of glass kiln is also known, which contains, for the purpose of preventing generation of frost-like matter on the brick surface of the upper structure of a glass melting cell, 0 to 1.5% by weight of CaO and 0.3 to 1.5% by weight of $K_2O$, based on the weight of silica brick, the sum of CaO and $K_2O$ being not more than 1.5% by weight (see JP-B-49-16087 (the term "JP-B" as used herein means an "examined Japanese patent publication")). It has also been proposed to add Fe, $Fe_2O_3$, $Cu_2O$, $TiO_2$, Si, etc.

The degree of ease of transformation of silica in a siliceous stone material into cristobalite and tridymite on heating tends to be affected by such factors as crystal grain size of silica and impurities in the siliceous stone material, and also varies depending on the place where the siliceous stone material is produced.

In general, a greater crystal grain size or a smaller impurity content tends to hamper the transformation of silica.

The present inventors have previously proposed an excellent additive which promotes transformation of silica in a siliceous stone material of the type in which transformation of silica is not easy, and a method of producing silica brick by using the additive as disclosed in U.S. Pat. No. 5,310,708 (corresponding to JP-A-5-4864 (the term "JP-A" as used herein means an "unexamined published Japanese patent application")). The method disclosed is characterized by adding from 0.2 to 5% by weight based on a siliceous stone material of $Na_2O$—CaO—$SiO_2$ fused and solidified material to the siliceous stone material. This additive reacts with silica in the siliceous stone material to promote transformation of the silica into cristobalite and tridymite, thereby producing silica brick having a markedly reduced content of residual silica, even when starting with a siliceous stone material in which transformation of silica is not easy. As a result of further investigations, the present inventors found that the addition of the $Na_2O$—CaO-$SiO_2$ fused and solidified material in the above specified amount results in an increase in amorphous glass content of the resulting silica brick. A large amorphous glass content in silica brick causes reduction in resistance to creep during long-term use as structural material of a coke oven or a hot blast stove.

On the other hand, too large a cristobalite content in silica brick makes the structure instable. Within a working temperature range of silica brick in coke ovens or hot blast stoves, the range of from 800° to 1400° C. is a region in which tridymite is stable. Therefore, cristobalite in silica brick used in the furnace is transformed to tridymite during use so that the brick after use is silica brick mainly comprising tridymite. The transformation from cristobalite to tridymite during use of a coke oven or a hot blast stove is accompanied by expansion, which makes the structure instable. The present inventors have analyzed silica brick after use and, as a result, found that silica brick mainly comprising tridymite is a preferred material of industrial furnaces.

The present invention has been reached based on the above findings.

SUMMARY OF THE INVENTION

Accordingly, an object of the present invention is to provide a method for producing silica brick having a small content of residual silica, mainly comprising tridymite, and having a reduced glass content so as to have improved creep resistance.

The above object of the present invention is accomplished by adding to a siliceous stone material a specific amount of $Na_2O$—CaO-$SiO_2$ fused and solidified material and a specific amount of iron oxide.

The present invention provides a method for producing silica brick comprising firing a siliceous stone material containing silica as a main component, wherein from 0.05 to 0.25% by weight of $Na_2O$—CaO-$SiO_2$ fused and solidified material and from 0.1 to 1.0% by weight, in terms of $Fe_2O_3$, of iron oxide, based on the siliceous stone material are added to the siliceous stone material, before firing.

DETAILED DESCRIPTION OF THE INVENTION

The $Na_2O$—CaO-$SiO_2$ fused and solidified material which can be used in the present invention is fused and solidified material containing $Na_2O$, CaO, $SiO_2$, and trace amounts of MgO and $Al_2O_3$, and usually has the following chemical composition:

$SiO_2$: 70 to 75 wt %
CaO: 5 to 13 wt %
$Na_2O$: 10 to 24 wt %
$Al_2O_3$: 0.5 to 2 wt %
MgO: 0.5 to 4 wt % and preferably the following chemical composition:

$SiO_2$: 70 to 75 wt %
CaO: 8 to 10 wt %
$Na_2O$: 13 to 14 wt %
$Al_2O_3$: 1 to 2 wt %
MgO: 3 to 4 wt %

The $Na_2O$—$CaO$—$SiO_2$ fused and solidified material is preferably added in the form of powder preferably having a particle size of not greater than 0.3 mm. Such a small particle size increases the specific surface area, which contributes to prevention of occurrence of pin-holes in the silica brick as the fired product and also to promotion of reaction with silica as the main component of the siliceous stone material, thus accelerating transformation.

The $Na_2O$—$CaO$—$SiO_2$ fused and solidified material (amorphous glass powder) used in the present invention can be prepared by mixing siliceous sand, sodium ash, lime carbonate, magnesium carbonate, and sodium feldspar at mixing ratios giving the above-mentioned chemical composition.

Examples of chemical compositions of the $Na_2O$—$CaO$—$SiO_2$ fused and solidified material are shown in Table 1 below. The glass beads or sheet glass powder shown in Table 1 are suitable forms of the $Na_2O$—$CaO$—$SiO_2$ fused and solidified material.

TABLE 1

| Component | Type | |
|---|---|---|
| | Glass Beads (wt %) | Sheet Glass Powder (wt %) |
| Ignition loss | 0.01 | 0.15 |
| $SiO_2$ | 71.47 | 71.40 |
| $Al_2O_3$ | 1.76 | 1.71 |
| $Fe_2O_3$ | 0.35 | 0.12 |
| $TiO_2$ | 0.04 | 0.27 |
| CaO | 9.36 | 8.10 |
| MgO | 3.25 | 3.88 |
| $Na_2O$ | 13.06 | 13.52 |
| $K_2O$ | 0.76 | 0.65 |

If the amount of the $Na_2O$—$CaO$—$SiO_2$ fused and solidified material added is too large, not only does the amorphous glass content in the resulting silica brick increase, which results in reduction in creep resistance, but also formation of cristobalite increases while suppressing formation of tridymite, failing to produce desired silica brick. Conversely, if the amount of the $Na_2O$—$CaO$—$SiO_2$ fused and solidified material is too small, the content of residual silica in the resulting silica brick cannot be reduced to 3% by weight or less. Silica brick containing residual silica exceeding 3% by weight is apt to undergo extraordinary expansion during use at high temperatures and is unsuitable as a structural material for industrial furnaces.

For these reasons, the amount of the $Na_2O$—$CaO$—$SiO_2$ fused and solidified material to be added should range from 0.05 to 0.25% by weight, preferably from 0.1 to 0.2% by weight, based on the siliceous stone material.

Iron oxide which can be used in the present invention includes $FeO \cdot Fe_2O_3$, $Fe_2O$ and/or $Fe_2O_3$ and preferably has a particle size of not greater than 0.3 mm, still preferably not greater than 0.1 mm. Iron oxide having a purity of 99% by weight or higher is preferred.

The amount of iron oxide to be added is from 0.1 to 1.0% by weight, preferably from 0.1 to 0.5% by weight, in terms of $Fe_2O_3$, based on the siliceous stone material. If it is less than 0.1% by weight, the formation ratio of tridymite is reduced. Addition of iron oxide exceeding 1.0% by weight results in formation of glass as well as other impurities, and it follows that refractoriness under load (JIS R2209) and creep resistance of the silica brick would be reduced.

The production of silica bricks in accordance with the method of the present invention can be carried out by, for example, adding prescribed amounts of the $Na_2O$—$CaO$—$SiO_2$ fused and solidified material and iron oxide to siliceous stone material crushed to a proper particle size, blending the mixture, forming mixed powder, and firing the formed mixed powder in a conventional manner (for example, U.S. Pat. No. 5,310,708). If desired, a plastic binder, such as lime (CaO-containing component), lignosulfonate or molasses, may be added to the mixture.

The present invention is particularly effective in cases where the siliceous stone material used is of such a type that the transformation of silica does not easily occur. It is possible to use as a raw material a mixture of siliceous stone material of this type and siliceous stone material in which transformation of silica easily takes place, pre-fired siliceous stone material, brick dust, and the like. It is also possible to add micro-fine silica powder containing amorphous silica having not less than 90% by weight of $SiO_2$ to the siliceous stone material in a proportion of less than 5% by weight, preferably less than 4% by weight, based on the siliceous stone material. Addition of such micro-fine silica powder provides increased density of structure of the silica bricks.

In addition, a CaO-containing material, such as $CaCO_3$, $Ca(OH)_2$ or CaO, may be added in various forms. The CaO component effectively promotes transformation of silica into tridymite and enhances bonding strength at room temperature. The CaO component is preferably added in an amount of from 1.5 to 3.0% by weight, more preferably from 2.0 to 2.5% by weight, based on the siliceous stone material. If the amount of the CaO component is less than 1.5% by weight, the resulting silica bricks tend to become crumbly at the corners, and spots are liable to appear on the surface to blacken it, resulting in deteriorated appearance. On the other hand, existence of CaO in excess over 3.0% by weight reduces the strength of the produced silica bricks at normal temperature to make the bricks fragile. It also causes detrimental effects such as increase in the porosity and deterioration of hot-characteristics, particularly refractoriness under load (JIS R2209) is lowered and creep resistance is impaired.

Firing of the siliceous stone material mixture can be conducted in a single kiln or a tunnel kiln, preferably at a firing temperature ranging from 1350° to 1470° C., more preferably from 1410° to 1450° C. Firing at a temperature below 1350° C. undesirably allows a large amount (3% by weight or more) of silica to remain without being transformed, whereas, firing at a temperature exceeding 1470° C. is not preferred also because the tridymite generated by transformation is unstable at such a high temperature and is liable to be changed into cristobalite.

In the production of silica brick according to the method of the present invention, a combined use of specific amounts of the $Na_2O$—$CaO$—$SiO_2$ fused and solidified material and iron oxide produces the following beneficial effects:
1) Tridymite is easily formed.
2) The silica brick produced mainly comprises tridymite with its residual silica content reduced to 2.0% by weight or less.
3) The silica brick produced has a small content of amorphous glass and therefore hardly suffers from deterioration of creep resistance.

The present invention will now be illustrated in greater detail with reference to Examples, but it should be understood that the present invention is not construed as being limited thereto. Unless otherwise indicated, all the percents are by weight.

EXAMPLES 1 TO 5

Siliceous stone material A or B having the composition and crystal grain size shown in Table 2 was mixed with the sheet glass powder (particle size: 5 to 300 μm) shown in Table 1 and iron oxide at ratios shown in Table 3, and silica bricks were produced from the mixture in a conventional manner (for example, U.S. Pat. No. 5,310,708). In each case, lime slurry was used as a CaO source and was added in an amount of 2% based on the siliceous stone material A or B. Firing was conducted by using a single kiln at 1410° C.

For reference, the chemical composition of another siliceous stone material of the type in which transformation of silica is easy, designated C, is also shown in Table 2.

The compositions and characteristics of the thus obtained silica bricks are shown in Table 3. The mineral compositions were determined by X-ray diffractometry. The characteristics were evaluated by the following methods:

Creep (%): Evaluated by the method of ASTM C546

Apparent porosity (%): Evaluated by the method of JIS R2205

Bulk specific gravity: Evaluated by the method of JIS R2205

TABLE 2

|  | A | B | C |
| --- | --- | --- | --- |
| Chemical Composition (%): |  |  |  |
| $SiO_2$ | 98.9 | 99.7 | 97.2 |
| $Al_2O_3$ | 0.35 | 0.14 | 0.78 |
| $Fe_2O_3$ | 0.06 | 0.07 | 0.57 |
| CaO | 0.02 | 0.04 | 0.04 |
| MgO | trace | trace | 0.07 |
| $Na_2O$ | trace | trace | 0.02 |
| $K_2O$ | 0.10 | 0.01 | 0.17 |
| Silica crystal size (μm) | 100–1000 | 100–200 | 5–15 (partly 50–100) |

TABLE 3

|  | Example No. | | | | |
| --- | --- | --- | --- | --- | --- |
|  | 1 | 2 | 3 | 4 | 5 |
| Siliceous stone material | A | A | A | A | B |
| Amount of glass added (%) | 0.05 | 0.1 | 0.15 | 0.2 | 0.25 |
| Amount of iron oxide added (%) | 0.7 | 0.5 | 0.5 | 0.7 | 0.7 |
| Mineral composition (%): |  |  |  |  |  |
| Silica | 1.0 | <0.5 | <0.5 | <0.5 | <0.5 |
| Cristobalite | 21.7 | 20.5 | 22.2 | 23.6 | 24.4 |
| Tridymite | 66.5 | 68.8 | 67.0 | 65.4 | 64.5 |
| Glass | 10.8 | 10.7 | 10.8 | 11.0 | 11.1 |
| Characteristics: |  |  |  |  |  |
| Creep (%); 1400° C., 0.2 MPa, 100 hrs. | 0.08 | 0.08 | 0.08 | 0.08 | 0.09 |
| Apparent porosity (%) | 21.8 | 21.8 | 21.6 | 21.5 | 20.9 |
| Bulk specific gravity | 1.80 | 1.80 | 1.81 | 1.81 | 1.82 |

It is apparent from Table 3 that the present invention provides silica bricks having a markedly reduced amount of residual silica and exhibiting excellent hot-characteristics.

COMPARATIVE EXAMPLES 1 TO 6

Comparative silica bricks were prepared in the same manner as in the foregoing Examples, except for using siliceous stone material A shown in Table 2 and adding either one of the glass and iron oxide in an amount as shown in Table 4. The mineral compositions of the thus obtained silica bricks were determined in the same manner as in the foregoing Examples and the characteristics of the thus obtained silica bricks were also evaluated in the same manner as in the foregoing Examples. The compositions and characteristics of the resulting silica bricks are shown in Table 4.

TABLE 4

|  | Comparative Example No. | | | | | |
| --- | --- | --- | --- | --- | --- | --- |
|  | 1 | 2 | 3 | 4 | 5 | 6 |
| Siliceous stone material | A | A | A | A | A | A |
| Amount of glass added (%) | 0 | 0 | 0 | 0.2 | 0.5 | 1.0 |
| Amount of iron oxide added (%) | 0 | 0.7 | 1.5 | 0 | 0 | 0 |
| Mineral composition (%): |  |  |  |  |  |  |
| Silica | 9.0 | 8.0 | 4.0 | 5.7 | 2.3 | <0.5 |
| Cristobalite | 49.0 | 48.7 | 41.0 | 40.0 | 31.0 | 27.0 |
| Tridymite | 31.6 | 32.5 | 43.3 | 43.6 | 55.5 | 61.0 |
| Glass | 10.4 | 10.8 | 11.7 | 10.7 | 11.2 | 12.0 |
| Characteristics: |  |  |  |  |  |  |
| Creep (%); 1400° C., 0.2 MPa, 100 hrs. | 0.07 | 0.09 | 0.11 | 0.09 | 0.10 | 0.12 |
| Apparent porosity (%) | 19.9 | 20.1 | 20.0 | 20.0 | 20.0 | 20.6 |
| Bulk specific gravity | 1.85 | 1.84 | 1.84 | 1.84 | 1.84 | 1.83 |

As can be seen from Table 4, in Comparative Example 1, in which neither the $Na_2O$—CaO—$SiO_2$ fused and solidified material nor iron oxide is added, the amount of residual silica is considerably high as 9.0% by weight and cristobalite is formed to a proportion as high as 49.0% by weight, failing to provide a desired silica brick.

The samples containing either one of the $Na_2O$—CaO—$SiO_2$ fused and solidified material and iron oxide (Comparative Examples 2, 4, and 5), even the ratio of the additive falling within the range specified in the present invention, show insufficient formation of tridymite. Samples containing either one of these additives in a large amount exceeding the specific range (Comparative Examples 3 and 6) has not only an insufficient amount of tridymite but an increased amount of glass. In either cases, a desired silica brick cannot be obtained.

COMPARATIVE EXAMPLES 7 TO 10

Comparative silica bricks were prepared in the same manner as in the foregoing Examples, except for using siliceous stone material A (Comparative Examples 7 to 9) or siliceous stone material C shown in Table 2 (material in which transformation of silica is easy) (Comparative Example 10), and changing the amounts of the glass and iron oxide as shown in Table 5. The mineral compositions of the thus obtained silica bricks were determined in the same manner as in the foregoing Examples and the characteristics of the thus obtained silica bricks were also evaluated in the same manner as in the foregoing Examples. The compositions and characteristics of the resulting silica bricks are shown in Table 5.

TABLE 5

|  | Comparative Example No. | | | |
| --- | --- | --- | --- | --- |
|  | 7 | 8 | 9 | 10 |
| Siliceous stone material | A | A | A | C |
| Amount of glass added (%) | 0.2 | 0.5 | 5.0 | 0 |
| Amount of iron oxide added (%) | 1.5 | 0.7 | 5.0 | 0 |
| Mineral composition (%): | | | | |
| Silica | ≦0.5 | ≦0.5 | ≦0.5 | ≦0.5 |
| Cristobalite | 21.8 | 25.0 | 31.5 | 13.2 |
| Tridymite | 66.3 | 63.4 | 47.2 | 76.3 |
| Glass | 11.9 | 11.6 | 21.3 | 10.5 |
| Characteristics: | | | | |
| Creep (%); 1400° C., 0.2 MPa, 100 hrs. | 0.11 | 0.11 | 0.28 | 0.07 |
| Apparent porosity (%) | 20.5 | 18.6 | 17.2 | 20.5 |
| Bulk specific gravity | 1.84 | 1.88 | 1.90 | 1.83 |

As can be seen from Table 5, even when both the $Na_2O$—CaO—$SiO_2$ fused and solidified material and iron oxide are used, should the amount of either one of them be out of the range specified in the present invention, a desired silica brick cannot be obtained due to the increased glass content as shown in Comparative Examples 7 to 9.

On comparing Tables 4 and 5 for Comparative Examples 1 to 9 with Table 3 for Examples 1 to 5, it is understood that excellent silica bricks mainly comprising tridymite with small contents of residual silica and glass cannot be obtained from siliceous stone material in which transformation of silica is difficult, such as siliceous stone material A or B, until a combination of 0.05 to 0.25% by weight of the $Na_2O$—CaO—$SiO_2$ fused and solidified material and 0.1 to 1.0% by weight of iron oxide are added to the siliceous stone material. The thus obtained silica brick is not inferior to the sample of Comparative Example 10 obtained from siliceous stone material C in which transformation of silica is easily occurs.

As has been fully described, the method of the present invention is characterized by adding specific amounts of $Na_2O$—CaO—$SiO_2$ fused and solidified material and iron oxide to a siliceous stone material and produces the following outstanding effects:

1) Transformation of silica into tridymite is effectively promoted.
2) Even in using a siliceous stone material of the type in which transformation of silica is not easy, silica brick having a reduced residual silica content and comprising tridymite as a main component can be produced.
3) The silica brick obtained has a reduced amount of amorphous glass and therefore exhibits improved creep resistance.

The method of the present invention provides silica bricks extremely useful in industry as high-temperature structural material for coke ovens, hot blast stoves, etc.

While the invention has been described in detail and with reference to specific examples thereof, it will be apparent to one skilled in the art that various changes and modifications can be made therein without departing from the spirit and scope thereof.

What is claimed is:

1. A method for producing silica brick comprising firing a siliceous stone material containing silica as a main component, wherein from 0.05 to 0.25% by weight of $Na_2O$—CaO—$SiO_2$ fused and solidified material and from 0.1 to 1.0% by weight, in terms of $Fe_2O_3$, of iron oxide, based on the siliceous stone material are added to the siliceous stone material, before firing.

2. A method for producing silica brick as claimed in claim 1, wherein said $Na_2O$—CaO—$SiO_2$ fused and solidified material is fused and solidified material containing $Na_2O$, CaO, $SiO_2$, and trace amounts of MgO and $Al_2O_3$, and has a chemical composition:

$SiO_2$: 70 to 75 wt %

CaO: 5 to 13 wt %

$Na_2O$: 10 to 24 wt %

$Al_2O_3$: 0.5 to 2 wt %

MgO: 0.5 to 4 wt %.

3. A method for producing silica brick as claimed in claim 1, wherein said $Na_2O$—CaO—$SiO_2$ fused and solidified material is a powdered material having a particle size of not greater than 0.3 mm.

4. A method for producing silica brick as claimed in claim 1, wherein said iron oxide is $FeO·Fe_2O_3$, $Fe_2O$ and/or $Fe_2O_3$ having a particle size of not greater than 0.3 mm.

* * * * *